United States Patent
Dutta et al.

(10) Patent No.: US 10,776,668 B2
(45) Date of Patent: Sep. 15, 2020

(54) EFFECTIVE BUILDING BLOCK DESIGN FOR DEEP CONVOLUTIONAL NEURAL NETWORKS USING SEARCH

(71) Applicant: Robert Bosch GmbH, Stuttgart (DE)

(72) Inventors: Jayanta Kumar Dutta, Sunnyvale, CA (US); Jiayi Liu, Fremont, CA (US); Unmesh Kurup, Mountain View, CA (US); Mohak Shah, Dublin, CA (US)

(73) Assignee: Robert Bosch GmbH, Stuttgart (DE)

( * ) Notice: Subject to any disclaimer, the term of this patent is extended or adjusted under 35 U.S.C. 154(b) by 109 days.

(21) Appl. No.: 16/212,733

(22) Filed: Dec. 7, 2018

(65) Prior Publication Data

US 2019/0188537 A1   Jun. 20, 2019

Related U.S. Application Data

(60) Provisional application No. 62/598,643, filed on Dec. 14, 2017.

(51) Int. Cl.
*G06K 9/62* (2006.01)
*G06K 9/66* (2006.01)

(52) U.S. Cl.
CPC ......... *G06K 9/6262* (2013.01); *G06K 9/6267* (2013.01); *G06K 9/66* (2013.01)

(58) Field of Classification Search
CPC ....... G06K 9/6262; G06K 9/6267; G06K 9/66
USPC ......................................................... 382/156
See application file for complete search history.

(56) References Cited

U.S. PATENT DOCUMENTS

| 6,278,899 B1 * | 8/2001 | Piche | G05B 13/048 |
| | | | 375/316 |
| 10,304,193 B1 * | 5/2019 | Wang | G06N 3/0481 |
| 2008/0042756 A1 * | 2/2008 | Waheed | H03B 5/04 |
| | | | 331/16 |
| 2019/0347847 A1 * | 11/2019 | Elgharib | G06N 3/0481 |

FOREIGN PATENT DOCUMENTS

EP     3451293     *  3/2019   ............. G06T 9/002

OTHER PUBLICATIONS

Bergstra, J. et al., "Making a Science of Model Search: Hyperparameter Optimization in Hundreds of Dimensions for Vision Architectures," Proceedings of the 30th International Conference on Machine Learning, 2013 (9 pages).
Chollet, F., "Xception: Deep Learning with Depthwise Separable Convolutions," arXiv, preprint arXiv:1610.02357, 2016 (8 pages).
(Continued)

*Primary Examiner* — Jerome Grant, II
(74) *Attorney, Agent, or Firm* — Maginot, Moore & Beck LLP

(57) ABSTRACT

A search framework for finding effective architectural building blocks for deep convolutional neural networks is disclosed. The search framework described herein utilizes a building block which incorporates branch and skip connections. At least some operations of the architecture of the building block are undefined and treated as hyperparameters which can be automatically selected and optimized for a particular task. The search framework uses random search over the reduced search space to generate a building block and repeats the building block multiple times to create a deep convolutional neural network.

19 Claims, 6 Drawing Sheets

(56) References Cited

OTHER PUBLICATIONS

Gastaldi, X., "Shake-Shake regularization," arXiv preprint, arXiv:1705.07485, 2017 (10 pages).
He, K. et al., "Deep Residual Learning for Image Recognition," arXiv:1512.03385v1 [cs.CV], 2015 (12 pages).
Szegedy, C. et al., "Inception-v4, Inception-ResNet and the Impact of Residual Connections on Learning," arXiv:1602.07261v2 [cs.CV], 2016 (12 pages).
Szegedy, C. et al., "Going Deeper with Convolutions," Proceedings of the IEEE conference on computer vision and pattern recognition, pp. 1-9, 2015 (9 pages).
Xie, S. et al., "Aggregated Residual Transformations for Deep Neural Networks," arXiv preprint, arXiv:1611.05431v2, 2017 (10 pages).
Young, S. R. et al., "Optimizing Deep Learning Hyper-Parameters Through an Evolutionary Algorithm," Proceedings of the Workshop on Machine Learning in High-Performance Computing Environments, ACM, 2015 (5 pages).
Abadi, M. et al., "TensorFlow: Large-Scale Machine Learning on Heterogeneous Distributed Systems," arXiv preprint arXiv:1603.04467v2, 2016 (19 pages).
"Challenges in Representation Learning: Facial Expression Recognition Challenge," https://www.kaggle.com/c/challenges-in-representation-learning-facial-expression-recognition-challenge, 2013 (2 pages).
Baker, B. et al., "Designing Neural Network Architectures Using Reinforcement Learning," arXiv:1611.02167v1 [cs.LG], 2016 (15 pages).
Bergstra, J. et al., "Random Search for Hyper-Parameter Optimization," Journal of Machine Learning Research, vol. 13, pp. 281-305, 2012 (25 pages).
Cai, H. et al., "Reinforcement Learning for Architecture Search by Network Transformation," arXiv:1707.04873v1 [cs.LG], 2017 (10 pages).
Krizhevsky, A., "Learning Multiple Layers of Features from Tiny Images," 2009 (60 pages).
Krizhevsky, A., "ImageNet Classification with Deep Convolutional Neural Networks," Advances in Neural Information Processing Systems, 2012 (9 pages).
Miikkulainen, R. et al., "Evolving Deep Neural Networks," arXiv:1703.00548v1 [cs.NE], 2017 (8 pages).
Negrinho, R. et al., "DeepArchitect: Automatically Designing and Training Deep Architectures," arXiv:1704.08792v1 [stat.ML], 2017 (12 pages).
Netzer, Y. et al., "Reading Digits in Natural Images with Unsupervised Feature Learning," NIPS workshop on Deep Learning and Unsupervised Feature Learning, 2011 (9 pages).
Real, E. et al., "Large-Scale Evolution of Image Classifiers," arXiv:1703.01041v1 [cs.NE], 2017 (10 pages).
Russakovsky, O. et al., "ImageNet Large Scale Visual Recognition Challenge," arXiv:1409.0575v3 [cs.CV], 2015 (43 pages).
Simonyan, K. et al., "Very Deep Convolutional Networks for Large-Scale Image Recognition," arXiv:1409.1556v1 [cs.CV], 2014 (10 pages).
Suganuma, M. et al., "A Genetic Programming Approach to Designing Convolutional Neural Network Architectures," arXiv:1704.00764v2 [cs.NE], 2017 (9 pages).
Tang, Y., "Deep Learning using Linear Support Vector Machines," arXiv:1306.0239v4 [cs.LG], 2015 (6 pages).
Zagoruyko, S. et al., "Wide Residual Networks," arXiv:1605.07146 [cs.CV], 2016 (13 pages).
Zeiler, M. D. et al., "Visualizing and Understanding Convolutional Networks," ECCV 2014, Part I, LNCS 8689, pp. 818-833, 2014 (16 pages).
Zhong, Z. et al., "Practical Network Blocks Design with Q-Learning," arXiv:1708.05552v1 [cs.CV], 2017 (11 pages).
Zoph, B. et al., "Neural Architecture Search With Reinforcement Learning," arXiv:1611.01578v1 [cs.LG], 2016 (15 pages).
Zoph, B. et al., "Learning Transferable Architectures for Scalable Image Recognition," arXiv:1707.07012v1 [cs.CV], 2017 (15 pages).

* cited by examiner

EFFECTIVE BUILDING BLOCK DESIGN FOR DEEP CONVOLUTIONAL NEURAL NETWORKS USING SEARCH

This application claims the benefit of priority of U.S. provisional application Ser. No. 62/598,643, filed on Dec. 14, 2017 the disclosure of which is herein incorporated by reference in its entirety.

FIELD

The method and system disclosed in this document relate to artificial neural networks and, more particularly, to building blocks for deep convolutional neural networks.

BACKGROUND

Unless otherwise indicated herein, the materials described in this section are not prior art to the claims in this application and are not admitted to the prior art by inclusion in this section.

Deep Convolutional Neural Networks (CNNs) currently produce state-of-the-art accuracy on many machine learning tasks including image classification. Early Deep Learning (DL) architectures used only convolution, fully connected, and/or pooling operations but still provided large improvements over classical vision approaches. Recent advances in the field have improved performance further by using several new and more complex building blocks that involve operations such as branching and skip connections. Finding the best deep model requires a combination of finding both the right architecture and the correct set of parameters appropriate for that architecture.

Since the set of operations to be used for each branch remains an active area of research, finding the correct building block involves searching over the possible configurations of branch components. This increase in the search space effectively means that, in addition to traditional deep CNN hyperparameters, such as layer size and the number of filters, training a model now includes searching over the various combinations involved in constructing an effective network. This increased complexity corresponds to increased training time and often means that the process of finding the right architecture or configuration remains the result of extensive search. In addition, this complexity also presents problems with generalization since larger networks are more easily overfit to the data. There has been some research in tackling these issues by automating the architecture discovery process. Techniques such as reinforcement learning or evolutionary algorithms are generally used to search through the architecture space. However, these search techniques are computationally expensive.

SUMMARY

A method for determining a structure of a deep convolutional neural network for performing a particular task is disclosed. The method comprises: storing, in a memory, a training dataset and a validation dataset related to the particular task, the training dataset and the validation dataset each including a plurality of labeled input and output data pairs; storing, in the memory, program instructions implementing a first convolutional neural network having an input and an output, the first convolutional neural network having a residual branch and feedforward branch connected in parallel between an input of the first convolutional neural network and a summation element, the summation element being configured to provide the output of the first convolutional neural network as a summation of an output of the residual branch and the input of the first convolutional neural network, the residual branch including at least one layer configured to perform at least one undefined operation to provide the output of the residual branch; selecting, with a processor, at least one operation from a defined set of operations; training, with the processor, a second convolutional neural network using the training data, the second convolutional neural network being formed, at least in part, by the first convolutional neural network, the selected at least one operation being used in place of the at least one undefined operation of the first convolutional neural network during the training; and evaluating, with the processor, at least one performance metric of the trained second convolutional neural network using the validation dataset.

A system for determining a structure of a deep convolutional neural network for performing a particular task is disclosed. The system comprises a data storage device and at least one processor operably connected to the data storage device. The data storage device is configured to store (i) a training dataset and a validation dataset related to the particular task, the training dataset and the validation dataset each including a plurality of labeled input and output data pairs, and (ii) a plurality of program instructions, the plurality of program instructions including program instructions implementing a first convolutional neural network having an input and an output, the first convolutional neural network having a residual branch and feedforward branch connected in parallel between an input of the first convolutional neural network and a summation element, the summation element being configured to provide the output of the first convolutional neural network as a summation of an output of the residual branch and the input of the first convolutional neural network, the residual branch including at least one layer configured to perform at least one undefined operation to provide the output of the residual branch. The at least one processor is configured to execute the plurality of program instructions on the data storage device to: randomly select at least one operation from a defined set of operations; train a second convolutional neural network using the training data, the second convolutional neural network being formed, at least in part, by the first convolutional neural network, the selected at least one operation being used in place of the at least one undefined operation of the first convolutional neural network during the training; and evaluate at least one performance metric of the trained second convolutional neural network using the validation dataset.

BRIEF DESCRIPTION OF THE DRAWINGS

The foregoing aspects and other features of the method, system, and non-transitory computer readable medium for determining a deep CNN building block are explained in the following description, taken in connection with the accompanying drawings.

DETAILED DESCRIPTION

Figure 1:
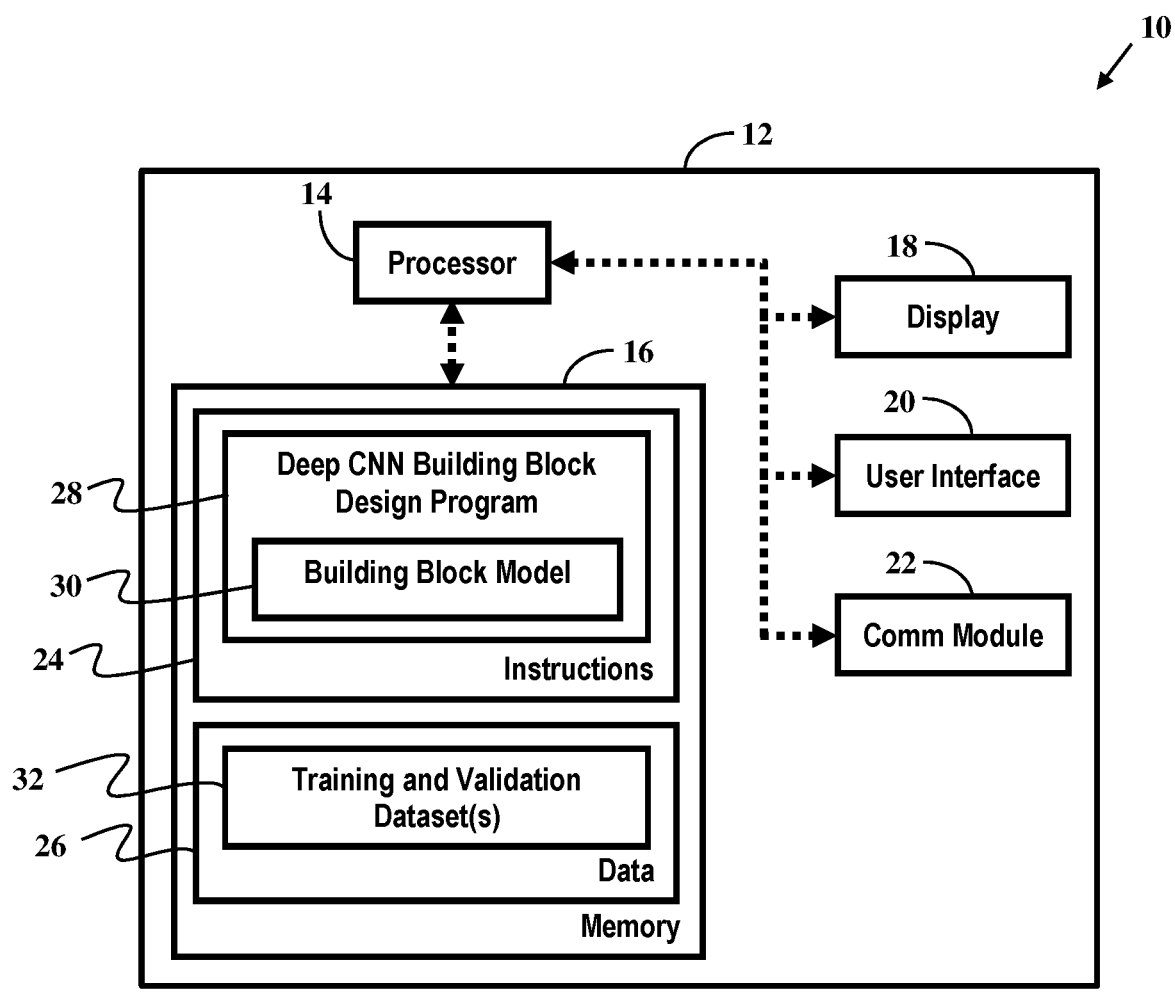
FIG. 1 shows a block diagram of an exemplary embodiment of a computing system for determining an effective deep CNN building block for a particular task.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

A search framework for finding effective architectural building blocks for deep convolutional neural networks (CNN) is introduced herein. The search framework described herein utilizes a deep CNN building block which incorporates branch and skip connections. The deep CNN building block is repeated many times to create the deep architecture. At least some operations of the architecture of the deep CNN building block are undefined and treated as hyperparameters which can be automatically selected and optimized for a particular task.

The search framework described herein is much faster at finding deep CNN models for a particular task that provide similar or better performance compared to state-of-the-art models for the particular task. Additionally, the models discovered by the search framework described herein are generally smaller than models discovered by alternative techniques (as measured in terms of total number of weight parameters). These twin advantages are achieved by designing the search space for the undefined operations of the architecture to include only a reduced set of possible operations for deep CNN building blocks. The search framework uses random search over the reduced search space to generate a deep CNN building block and repeats this block multiple times to create a deep network. In this way, the search framework has the further advantage that the search process is much simpler than alternative approaches using, for example, reinforcement learning and evolutionary techniques that need many more trials to generate architectures with comparable performance.

System for Designing Effective Building Blocks for Deep CNN Models

FIG. 1 shows a block diagram of an exemplary embodiment of a computing system 10 for determining an effective deep CNN building block for a particular task. The computing system 10 is typically provided in a housing, cabinet, or the like 12 that is configured in a typical manner for a computing device. In the illustrated embodiment, the computing system 10 includes a processor 14, memory 16, a display 18, a user interface 20, and a network communications module 22. It will be appreciated, however, that the illustrated embodiment of the computing system 10 is only one exemplary embodiment of a computing system 10 and is merely representative of any of various manners or configurations of a personal computer, laptop computer, server, or any other data processing systems that are operative in the manner set forth herein.

The processor 14 is configured to execute instructions to operate the computing system 10 to enable the features, functionality, characteristics and/or the like as described herein. To this end, the processor 14 is operably connected to the memory 16, display 18, the user interface 20, and the network communications module 22. The processor 14 generally comprises one or more processors which may operate in parallel or otherwise in concert with one another. It will be recognized by those of ordinary skill in the art that a "processor" includes any hardware system, hardware mechanism or hardware component that processes data, signals, or other information. Accordingly, the processor 14 may include a system with a central processing unit, multiple processing units, or dedicated circuitry for achieving specific functionality.

The memory 16 may be of any type of device capable of storing information accessible by the processor 14, such as a memory card, ROM, RAM, write-capable memories, read-only memories, hard drives, discs, flash memory, or any of various other computer-readable medium serving as data storage devices as will be recognized by those of ordinary skill in the art. The memory 16 is configured to store program instructions 24 for execution by the processor 14, as well as data 26. The program instructions 24 at least include a deep CNN building block design program 28. The deep CNN building block design program 28 includes at least some instructions implementing a CNN building block model 30, as well as implementing other network components used to form the deep CNN discussed herein. In at least one embodiment, the data 26 includes training and validation dataset(s) 32 which relate the particular task for which a deep CNN is being designed. In at least some embodiments, the training and validation dataset(s) 32 comprise image recognition datasets, such as CIFAR-10, CIFAR-100, SVHN, and FER2013. However, the computing system 10 and the deep CNN building block design program 28 are applicable to tasks other than image recognition. The deep CNN building block design program 28 is configured to enable the computing system 10 to determine the structure and/or operations that form a CNN building block that is repeated to create a deep CNN configured to perform a particular task. More particularly, the deep CNN building block design program 28 is configured to enable the computing system 10 to determine the ideal operations to use in place of in undefined operations of the CNN building block, selected from a limited set of possible operations.

The network communication module 22 of the computing system 10 provides an interface that allows for communication with any of various devices using various means and may comprise one or more modems, transceivers, network adapters, or the like. In particular, the network communications module 22 may include a local area network port that allows for communication with any of various local computers housed in the same or nearby facility. In some embodiments, the network communications module 22 further includes a wide area network port that allows for communications with remote computers over the Internet. Alternatively, the computing system 10 communicates with the Internet via a separate modem and/or router of the local area network. In one embodiment, the network communications module is equipped with a Wi-Fi transceiver or other wireless communications device. Accordingly, it will be appreciated that communications with the computing system 10 may occur via wired communications or via the wireless communications. Communications may be accomplished using any of various known communications protocols.

The computing system 10 may be operated locally or remotely by a user. To facilitate local operation, the computing system 10 may include the display 18 and the user interface 20. Via the user interface 20, a user may access the instructions, including the deep CNN building block design program 28, and may collect data from and store data to the memory 16. In at least one embodiment, the display 18 may include an LCD display screen or the like. In at least one embodiment, the user interface 20 may suitably include a mouse or other pointing device, a keyboard or other keypad, speakers, and a microphone, as will be recognized by those of ordinary skill in the art. It will be appreciated that the display 18 and the user interface 20 may be integrated on or within the housing 12 or may be external devices which are operably connected via a connector arranged on the housing 12 (not shown). Alternatively, in some embodiments, a user may operate the computing system 10 remotely from another computing device which is in communication therewith via the network communication module 22 and has an analogous display and user interface.

Building Block for Deep CNN Models

A deep convolutional neural network and a building block thereof is described below. The deep CNN and the building block thereof are broadly considered machine learning models. As used herein, the term "machine learning model" refers to a system or set of program instructions and/or data configured to implement an algorithm, process, or mathematical model that predicts and provides a desired output based on a given input. It will be appreciated that parameters of a machine learning model are not explicitly programmed and the machine learning model is not, in the traditional sense, explicitly designed to follow particular rules in order to provide the desired output for a given input. Instead, the machine learning model is provided with a corpus of training data (e.g., the training dataset, discussed above) from which identifies or "learns" patterns and statistical relationships or structures in the data, which are generalized to make predictions with respect to new data inputs. The result of the training process is embodied in a plurality of learned parameters, kernel weights, and/or filter values that are used in the various layers of neural network that comprises the machine learning model to perform various operations or functions. In the description of the deep CNN and the building block thereof, statements that a layer or some other component performs some process/function or is configured to perform some process/function means that a processor or controller (e.g., the processor 14) executes corresponding program instructions stored in a memory (e.g., the memory 16) with reference to the parameters, kernel weights, and/or filter values learned in the training process to perform the stated operation or function.

Figure 2:
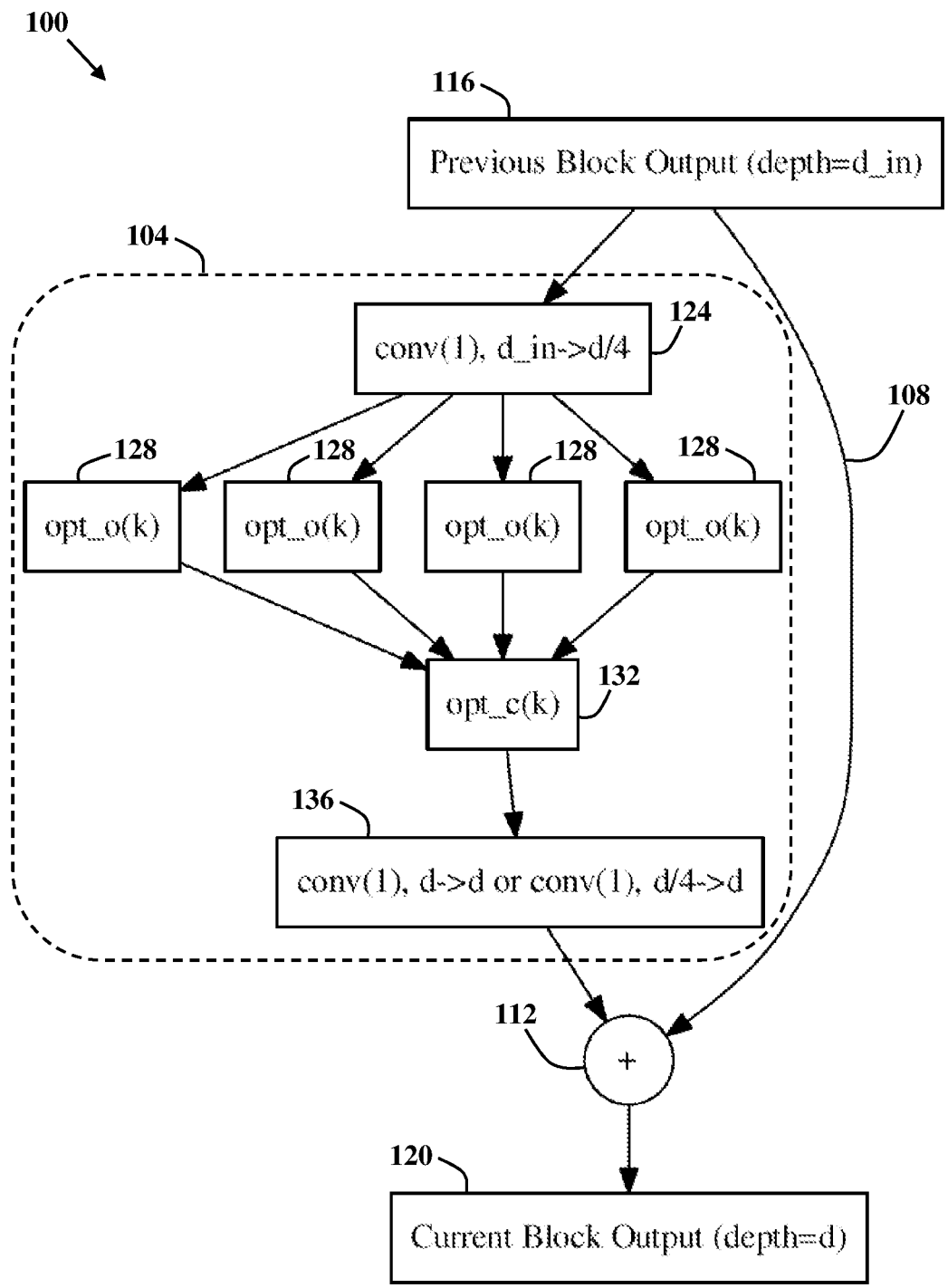
FIG. 2 shows a building block which can be repeated to form a deep convolutional neural network for performing a particular task.

FIG. 2 shows a building block 100 which can be repeated to form a deep CNN configured to perform a particular task such as, but not limited to, image recognition and/or image classification. As discussed in greater detail, the building block 100 includes operations which are undefined and these undefined operations can be filled with any operation from a defined set of possible operations. The building block 100 takes the form of a residual network (which may be referred to elsewhere herein as a residual block) comprising a residual branch 104, a skip connection 108 (which may be referred to elsewhere herein as a feedforward branch), and a summation element 112. The residual network structure of building block 100 enables easier training of much deeper neural networks, while providing performance that is similar to or better than state-of-the-art networks.

A previous block output 116 is passed to the residual branch 104, as well as to the summation element 112 via the skip connection 108. The residual branch 104 processes the previous block output 116 and passes its output to the summation element 112. The summation element 112 performs an element-wise summation of the output of the residual branch 104 with the previous block output 116 and provides a current block output 120 to a subsequent block. Thus, the operation of the building block 100 can be described more formally by the equation:

$$G(x)=x+F(x) \qquad (1),$$

where x is the input of the building block 100 (e.g., from the previous block output 116), G(x) is the output of the building block 100, and F(x) is the output of a residual branch 104 of the building block 100.

The residual branch 104 includes at least one layer configured to perform an undefined operation which may be selected from a defined set of possible operations. In at least one embodiment, the residual branch 104 has a bottleneck configuration in which an initial convolutional layer reduces a depth dimension of the input to the residual branch 104 and a final layer increases again the depth dimension. At least one layer configured to perform an undefined operation is included between the initial layer and the final layer. It will be appreciated that this bottleneck design has the advantage of reducing the number of parameters for deeper networks. Moreover, the bottleneck design reduces the computational expense of undefined operation(s) performed by the layer(s) between the initial convolutional layer that reduces the depth dimension and the subsequent layer that increases the depth dimension.

In the illustrated embodiment, the residual branch 104 includes an initial convolutional layer 124 configured to perform a convolution operation on the input of the residual branch 104 or, equivalently, the previous block output 116. It will be appreciated that a convolutional layer generally acts as learnable filter that responds to certain features when convolved with an input, producing a filtered output. Parameter values of the convolutional filter(s) of the convolutional layer are learned and/or optimized during the training process. The initial convolutional layer 124 is configured to reduce an input feature depth d_in from the previous block output 116 by a predetermined factor (e.g., a factor of 4) with respect to an output feature depth d of the block 100 (e.g., d_in →d/4). In at least one embodiment, initial convolutional layer 124 is configured to perform the convolution operation with a 1×1 filter size.

In the illustrated embodiment, the residual branch 104 further includes a plurality of convolutional layers 128, each configured to perform an undefined convolution operation opt_o(k) on an output of the initial convolutional layer 124. The plurality of convolutional layers 128 are arranged in parallel branches from the output of initial convolutional layer 124. In the illustrated embodiment, the plurality of convolutional layers 128 includes four different convolutional layers 128 arranged in parallel, but a different number of parallel convolutional layers 128 may be included (e.g., 2, 4, 5, etc.) The undefined convolution operations opt_o(k) may be selected from a defined set of possible convolution operations having a filter dimension k selected from a predetermined set of possible filter dimensions (e.g., k ∈ {1, 3, 5}).

Figure 3:
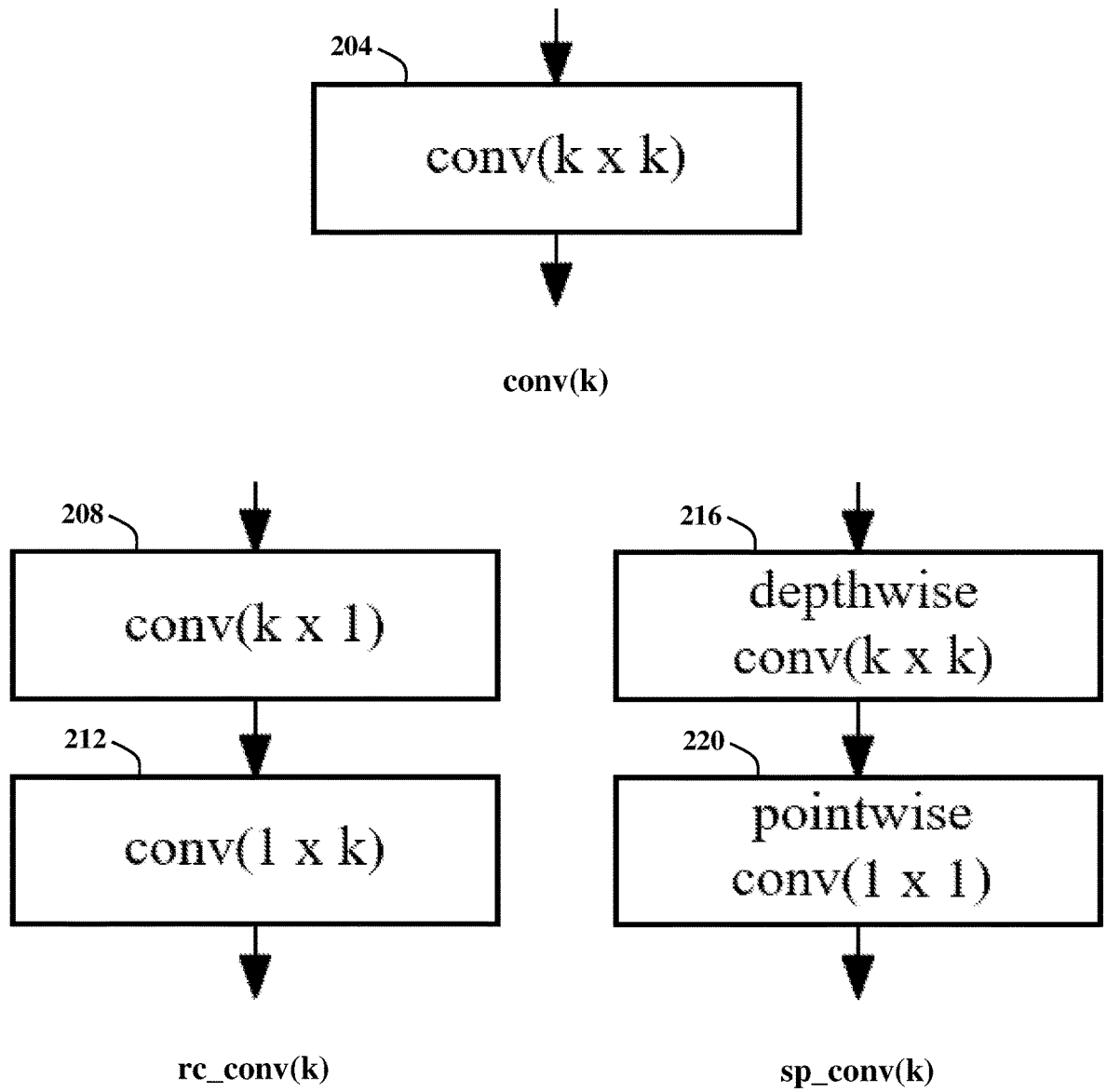
FIG. 3 shows an exemplary selection of three possible convolution operations which may comprise a defined set of possible convolution operations.

FIG. 3 shows an exemplary selection of three possible convolution operations which may be included in the defined set of possible convolution operations: conv(k), rc_conv(k), and sp_conv(k). However, it will be appreciated that the defined set of possible convolution operations may include any number of different types of convolution operations, not limited to those described herein. Each of the possible convolution operations conv(k), rc_conv(k), and sp_conv(k) has a filter dimension k selected from the predetermined set of possible filter dimensions (e.g., k ∈{1, 3, 5}). In at least one embodiment, each undefined operation of the building block 100 has an independently selected filter dimension k from the predetermined set of possible filter dimensions However, in other embodiments, the filter dimension k is selected to be the same for all undefined operations of the building block 100, thereby limiting the search space.

First, the conv(k) operation comprises a simple convolutional filter layer 204 with a k×k filter size. Second, the rc_conv(k) operation comprises a first convolutional filter layer 208 having a k×1 filter size followed by a second convolutional filter layer 212 having a 1×k filter size. It will be appreciated that the structure of the rc_conv(k) operation reduces the number of parameters used. Third, the sp_conv (k) operation is a k×k depthwise separable convolution operation comprising a depthwise convolution layer 216 followed by a pointwise convolution layer 218. The depthwise convolution layer 216 is configured to perform a k×k spatial convolution independently over each channel of the input thereof. The pointwise convolution layer 218 is configured to perform a 1×1 convolution to project the channels output by the depthwise convolution layer 216 onto a new channel space. It will be appreciated that the structure of the sp_conv(k) operations enables more efficient use of model parameters.

Returning to FIG. 2, in the illustrated embodiment, the residual branch 104 further includes a combination layer 132 configured to perform an undefined combination operation opt_c(k) to combine outputs of the plurality of parallel convolutional layers 128. The undefined combination operation opt_c(k) may be selected from a defined set of possible combination operations having a dimension k matching the selected filter dimension k of the parallel convolutional layers 128. Exemplary combination operations in the defined set of possible combination operations are discussed below in further detail.

Figure 4:
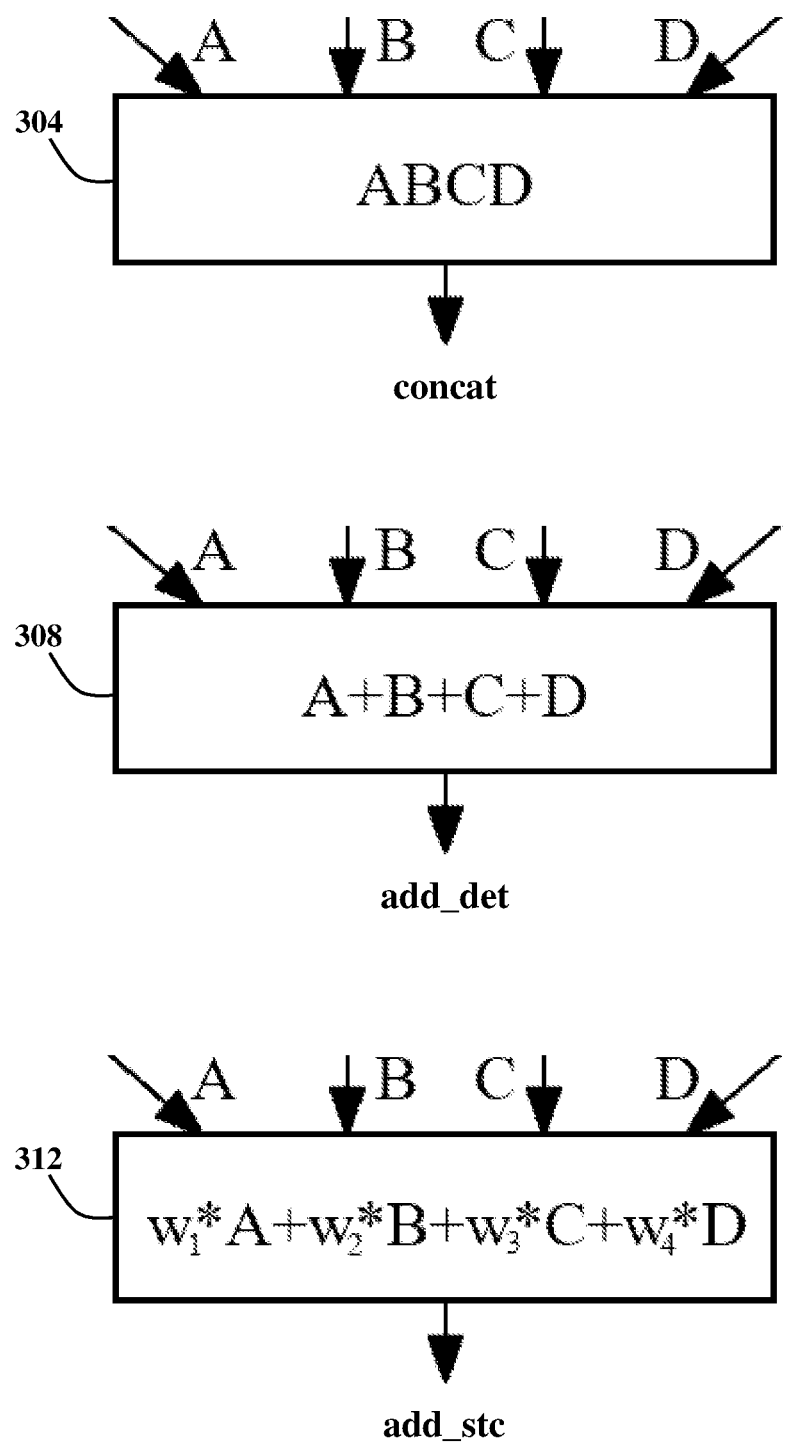
FIG. 4 shows an exemplary selection of three possible combination operations which may comprise a defined set of possible combination operations.

FIG. 4 shows an exemplary selection of three possible combination operations which may be included in the defined set of possible combination operations: concat, add_det, and add_stc. However, it will be appreciated that the defined set of possible combination operations may include any number of different types of combination operations, not limited to those described herein. Each of the possible combination operations concat, add_det, and add_stc are configured to combine a plurality of outputs (e.g., A, B, C, and D) provided by the preceding parallel convolutional layers 128, but each in a different manner.

First, the concat operation comprises a concatenation layer 304 configured to concatenate the outputs (e.g., A, B, C, and D) provided by the preceding convolution operation branches in the feature dimension (e.g., ABCD). Second, the add_det operation comprises a deterministic summation layer 308 configured to add the outputs (e.g., A, B, C, and D) provided by the preceding convolution operation branches in the feature dimension (e.g., A+B+C+D). Third, the add_stc operation comprises a stochastic summation layer 312 configured to add the outputs (e.g., A, B, C, and D) provided by the preceding convolution operation branches in the feature dimension, weighted by a random constant (e.g., $w_1*A+w_2*B+w_3*C+w_4*D$). In at least one embodiment, the weights are generated from uniform distribution.

Finally, in the illustrated embodiment, the residual branch 104 includes a final convolutional layer 136 configured to perform a convolution operation on the output of the combination layer 132. The final convolutional layer 136 is configured to increase the feature depth of the output of the combination layer 132 by a predetermined factor (e.g., a factor of 4) to be the desired output feature depth d of the block 100 (e.g., d/4→d, or otherwise depending on the depth of previous layer). In at least one embodiment, final convolutional layer 136 is configured to perform the convolution operation with a 1×1 filter size.

In at least one embodiment, each layer and/or operation of the residual branch 104 is followed by batch normalization and a rectified linear unit (ReLU) activation function. In some embodiments, strided operation is used in one or more convolution layers of the building block 100 to provide spatial feature space reduction. Particularly, in at least one embodiment, in the case of feature reduction, a 1×1 convolution with stride 2 may applied on the input feature map of the block 100 to match the dimension of the residual branch 104 before adding them. In at least one embodiment, the number of output units is doubled in the case of spatial feature size reduction to maintain constant hidden state dimension.

Figure 5:
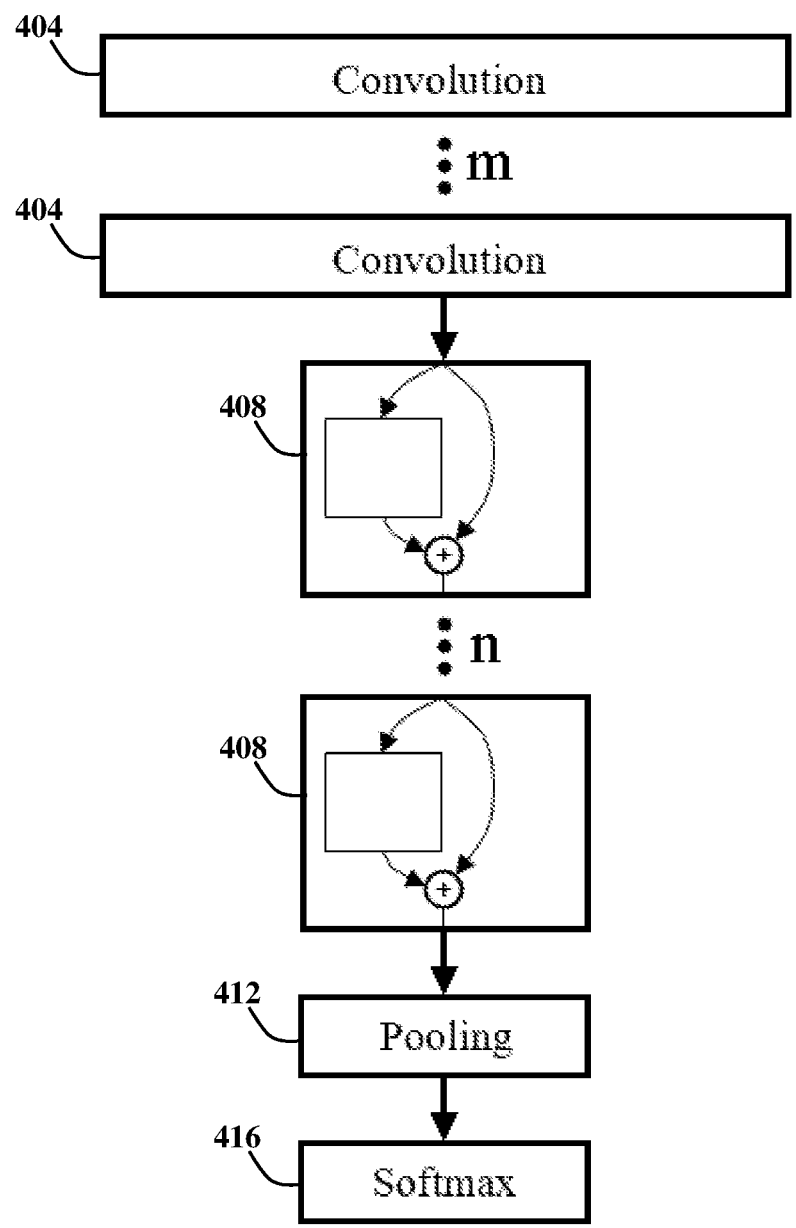
FIG. 5 shows a deep convolutional neural network for performing a particular task.

FIG. 5 shows a deep convolutional neural network 400 for performing a particular task. In at least one embodiment, the deep CNN 400 begins with a sequence of m initial convolution filter layers 404. As mentioned above, it will be appreciated that a convolutional layer generally acts as learnable filter that responds to certain features when convolved with an input, producing a filtered output. In at least one embodiment, each of the initial convolution filter layers 404 utilize with a plurality of convolutional filter parameters, the values of which are learned and/or optimized during a training process. In some embodiments, the filter parameters of the initial convolution filter layers 404 may be initialized randomly or with predetermined values before beginning the training process. The initial convolution filter layers 404 receive input data and perform convolution and/or filtering operation on the input to provide filtered and/or processed data as an intermediate output. In some embodiments, some or all of the initial convolution filter layers 404 may be followed by followed by batch normalization and/or a rectified linear unit (ReLU) activation function. In at least one embodiment, the number of initial convolution filter layers 404m included in the deep CNN 400 is treated as a hyperparameter which can be predefined or optimized by performing several trials.

In the deep CNN 400, the initial convolution filter layers 404 are followed by a sequence of n building blocks 408. Each of the building blocks 408 include the same structure as the building block 100 and utilize the same selected operations in place of the undefined operations (the selection process is described in detail elsewhere herein), with the same selected filter dimensions k. Much like the convolution filter layers 404, the convolutional layers of each of the building blocks 408 utilize a plurality of convolutional filter parameters, the values of which are learned and/or optimized during a training process. It will be appreciated, however, that the other components of each of the building blocks 408 do not necessarily utilize any learned parameters. In some embodiments, the filter parameters of the convolutional layers of each of the building blocks 408 may be initialized randomly or with predetermined values before beginning the training process. In at least one embodiment, the number of building blocks 408n included in the deep CNN 400 is treated as a hyperparameter which can be predefined or optimized by performing several trials.

In some embodiments, the deep neural network 400 includes a pooling layer 412 configured to pool and/or reduce the dimensionality of the output data provided by the building blocks 408 with a predetermined pool size. In one embodiment, the pooling layer 412 is an average pooling layer or a max pooling layer. In some embodiments, additional pooling layers may be include after various ones of the initial convolution filter layers 404 or after various ones of the building blocks 408. However, in some embodiments, the deep neural network 400 does not include any pooling layers and strided operation of the convolutional layers is solely used for reducing dimensionality. Additionally, dropout layers (not shown) may be included to dropout a random set (e.g., 50%) of activations after various ones of the initial convolution filter layers 404 or after various ones of the building blocks 408, for the purpose of preventing overfit. However, in some embodiments, no dropout layers are used.

Finally, the deep neural network 400 is ended with a classifier layer 416 which receives the pooled data from the pooling layer 412 and provides an output of the deep neural network 400. In at least one embodiment, the classifier layer 416 includes a softmax output layer In the case of image classification tasks, the softmax output layer may comprise a multiway (e.g., 1000-way) softmax output layer, which produces a probability distribution over 1000 different possible class labels. In some embodiment, the classifier layer 416 includes a fully connected layer that feeds the pooled data from the pooling layer 412 to the softmax output layer. However, in some embodiments, the fully connected layer is omitted to reduce the number of parameters.

Method for Designing Effective Building Blocks for Deep CNN Models

Methods for operating the computing system 10 are described below. In particular, methods of operating the computing system 10 to design an effective building block which can be repeated to form a deep CNN configured to perform a particular task are described. In the description of the methods, statements that a method is performing some task or function refers to a controller or general purpose processor (e.g., the processor 14) executing programmed instructions (e.g., the deep CNN building block design program 28 and/or the building block model 30) stored in non-transitory computer readable storage media (e.g., the memory 16) operatively connected to the controller or processor to manipulate data or to operate one or more components in the computing system 10 to perform the task or function. The controller or processor may be implemented with more than one processor and associated circuitry and components, each of which is configured to form one or more tasks or functions described herein. It will be appreciated that some or all of the operations the method can also be performed by a remote server or cloud processing infrastructure. Additionally, the steps of the methods may be performed in any feasible chronological order, regardless of the order shown in the figures or the order in which the steps are described.

Figure 6:
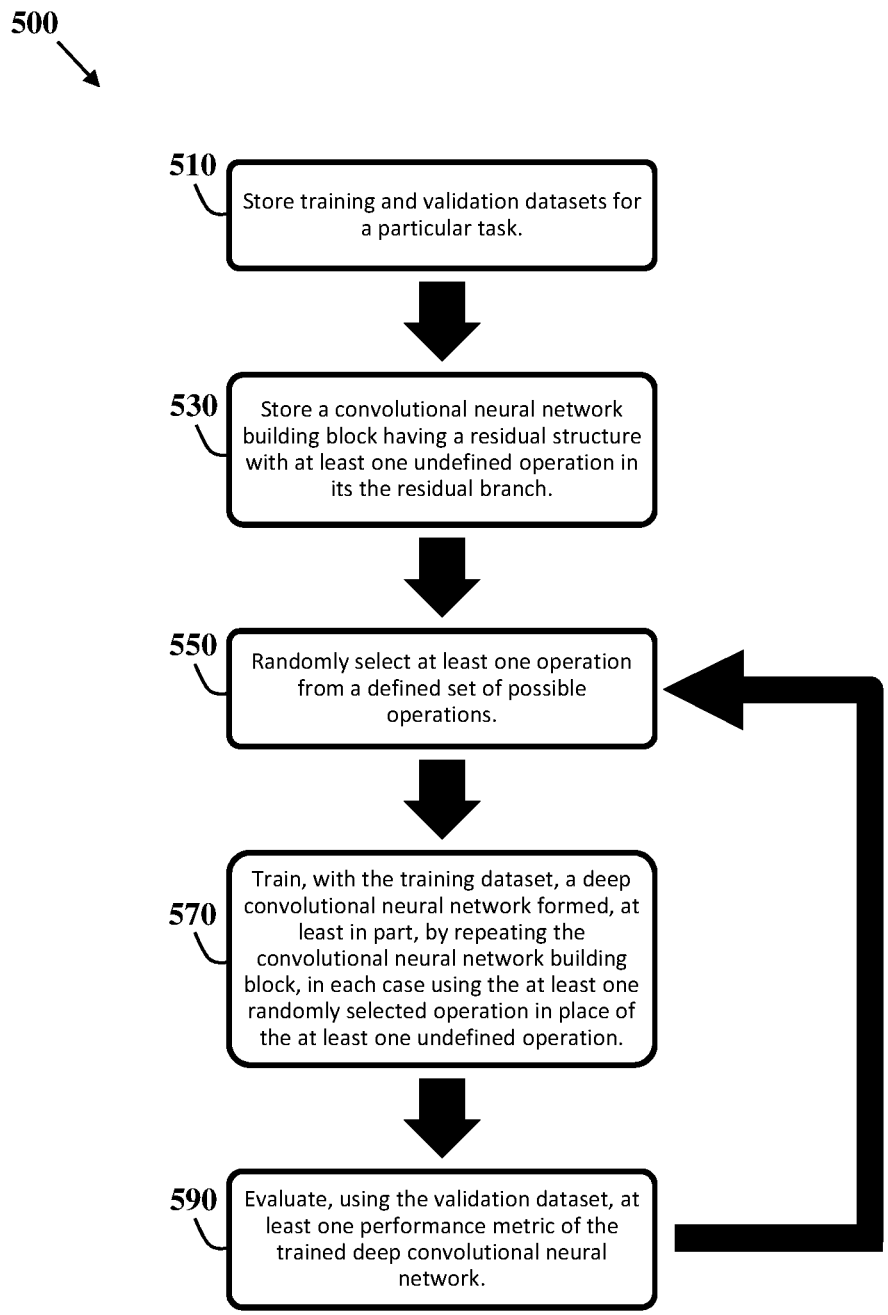
FIG. 6 shows a logical flow diagram for a method for determining the operations of a deep CNN building block to be used for a particular task.

FIG. 6 shows a logical flow diagram for a method 500 of operating the computing system 10 to design an effective building block which can be repeated to form a deep CNN configured to perform a particular task. The method 500 improves upon the functioning of the computing system 10 and, more particularly, the functioning of the processor 14 of the computing system 10, by advantageously utilizing the building block 100 having one or more undefined operations (e.g., the undefined operations opt_o(k) and/or opt_c(k), discussed above), which is repeated to form a deep CNN configured to perform the particular task. The method 500 advantageously utilizes a random search framework for identifying the optimal operations to be used in place of the one or more undefined operations. The random search framework is much faster at finding deep CNN models for a particular task that provide similar or better performance compared to state-of-the-art models for the particular task. The random search framework has the advantage that the search process is much simpler than alternative approaches using, for example, reinforcement learning and evolutionary techniques that need many more trials to generate architectures with comparable performance. Additionally, the models discovered by the method 500 are generally smaller than models discovered by alternative techniques (as measured in terms of total number of weight parameters). These twin advantages are achieved by limiting the search space for the undefined operations of the building block 100 to include only a reduced set of possible operations for deep CNN building blocks.

The method 500 begins with a step of receiving and/or storing a training dataset and a validation dataset related to a particular task to be performed by a deep convolutional neural network (block 510). Particularly, with respect to the embodiments disclosed in detail herein, the memory 16 of the computing system 10 is configured to store the training and validation dataset(s) 32 which relate the particular task for which a deep CNN is being designed. In some embodiments, the processor 14 of the computing system 10 is configured to operate the network communications module 22 to receive the training and validation dataset(s) 32 from an external source and, subsequently, operate the memory 16 to store the training and validation dataset(s) 32. In at least some embodiments, the training and validation dataset(s) 32 comprise a plurality of labeled data pairs and/or labeled data triplets. As used herein "labeled" training data or validation data refer to data which is labeled as an input or output for the purpose of supervised training of a machine learning model or validating a performance of the machine learning model, such as the deep CNN 400 discussed above. In the case of labeled data pairs, first data is labeled as an input and associated second data is labeled as an output. For example, for image recognition and/or image classification tasks, the training and validation dataset(s) 32 comprise a plurality of input images, each associated with classification data indicating a correct classification of each respective image. Exemplary image recognition datasets include CIFAR-10, CIFAR-100, SVHN, and FER2013. However, it will be appreciated that the computing system 10 and the deep CNN building block design program 28 are applicable to tasks other than image recognition. Some training and validation dataset(s) 32 for other tasks comprise labeled data triplets, wherein first data is labeled as an input, associated second data is labeled as a correct or positive output, and associated third data is labeled as an incorrect or negative output.

The method 500 continues with a step of storing a convolutional neural network building block having a residual structure with at least one undefined operation in its the residual branch (block 530). Particularly, with respect to the embodiments disclosed in detail herein, the memory 16 of the computing system 10 is configured to program instructions implementing a convolutional neural network building block 100. As discussed above, the building block 100 has an input which receives the previous block output 116 and an output which provides a current block output 120. The building block 100 has a residual structure comprising a residual branch 104, which includes at least one undefined operation, and feedforward branch and/or skip connection 108. The residual branch 104 and the skip connection 108 are connected in parallel between the input 116 of the building block 100 and a summation element 112. The summation element 112 is configured to provide the block output 120 as a summation of an output of the residual branch 104 and the input 116 of the building block 100.

The memory 16 is further configured to store program instructions implementing the defined sets of possible operations that can be used in place of the undefined operations of the building block 100. For example, in at least one embodiment, the memory 16 is further configured to store program instructions implementing each of the possible convolution operations conv(k), rc_conv(k), and sp_conv(k) and each of the possible combination operations concat, add_det, and add_stc. Finally, the memory 16 is further configured to store program instructions implementing the additional elements of the deep CNN 400 other than the building block 100, such as the initial convolution filter layer(s) 404, the pooling layer(s) 412, the fully connected layer(s) 416, and any other batch normalizations, activation functions, or dropout layers of the deep CNN 400.

The method 500 continues with a step of randomly selecting at least one operation from a defined set of possible operations (block 550). Particularly, the method 500 treats the choice of operations within the building blocks 404 as hyperparameters. The processor 14 of the computing system 10 is configured to randomly select operations from the defined sets of possible operations to be used in the building blocks 404 of the deep CNN 400. More particularly, in at least one embodiment, the processor 14 of the computing system 10 is configured to randomly select convolution operations from the defined set of possible convolution operations (e.g., conv(k), rc_conv(k), and sp_conv(k)) to be used in each branch within the residual branch 104 to be used in place of the undefined convolution operations opt_o(k) and randomly select a combination operation from the defined set of possible combination operations (e.g., concat, add_det, and add_stc) to be used in place of the undefined combination operations opt_c(k). In at least one embodiment, the processor 14 of the computing system 10 is configured to randomly select a filter dimension k for the convolution operations used in the building blocks from a predetermined set of possible filter dimensions (e.g., k∈{1, 3, 5}). In one embodiment, the processor 14 is configured to select a single filter dimension k to be used for every undefined convolution operation opt_o(k) in each building, thereby limiting the search space for discovering a suitable architecture for the deep CNN 400.

It will be appreciated that, as the method 500 treats the selection of operations in the residual branch 104 of the building block 100 and/or 404 as hyperparameters, many other optimization methods can be used. However, random search provides the simplest methods for hyperparameter optimization. Compared to iterating over predefined parameter combinations (i.e., grid search), random search shows a good balance between exploration and exploitation, and thus better convergence rate. It is also less sensitive to the prior assumptions on the distribution of hyperparameters which makes it a more robust alternative when applied to many different problems. In addition, random search is naively parallelizable as there is no dependency on historical results. Finally, it will be appreciated that other hyperparameters, such as n and m, discussed above, the learning rate, momentum, initialization, etc., can be discovered and/or optimized using other methods not described in detail herein.

The method 500 continues with a step of training, with the training dataset, a deep convolutional neural network formed, at least in part, by repeating the convolutional neural network building block, in each case using the at least one randomly selected operation in place of the at least one undefined operation (block 570). Particularly, one a set of operations has been selected to use in place of the undefined operations of the building block 100, the processor 14 is configured to train the deep convolution network 400, which is form at least in part, by repeating the building block 100 one or more times in series. Particularly, as described with respect to FIG. 5, in at least one embodiment, the deep CNN 400 is formed by a plurality of (m) initial convolutional layers 404 arranged in series, followed by a plurality of (n) repetitions of the building block 100 and/or 404 arranged in series, in each case the selected at least one operation being used in place of the at least one undefined operation of the first convolutional neural network during the training. Furthermore, in at least some embodiments, the deep CNN 400 is formed with various pooling layer(s) 412, fully connected layer(s) 416, batch normalizations, activation functions, and dropout layers, as discussed above.

In the training process, the processor 14 is configured to determine optimized values for the parameters, kernels, and/or weights of at least the convolutional layers of the deep CNN 400 using the training dataset 32. In at least one embodiment, the processor 14 is configured to determine the optimized values by minimizing a loss function evaluates an output of the deep CNN 400 with respect to the correct output identified by the labeled training data in the training dataset 32.

The method 500 continues with a step of evaluating, using the validation dataset, at least one performance metric of the trained deep convolutional neural network (block 590). Particularly, after the deep CNN 400 is trained using the selected set of operations in place of the undefined operations of the building block 100, the processor 14 is configured to evaluate at least one performance metric of trained deep CNN 400 using the validation dataset 32. It at least one embodiment, the processor 14 is configured to determine an accuracy of the trained deep CNN 400 in providing the correct output corresponding to a given input from the validation dataset 32. It at least one embodiment, the processor 14 is configured to determine an average value of the loss function when the trained deep CNN 400 is applied to the validation dataset 32. The processor 14 is configured to store the value(s) of the evaluated performance metric(s) are stored in the memory 16 for later comparison of each experiment and/or trial. Additionally, the processor 14 is configured to store in the memory 16 in association with the value(s) of the evaluated performance metric(s) the hyperparameters used, including the selected set of operations that were used in place of the undefined operations of the building block 100, the values selected for k, n, m, and any other hyperparameter.

The method 500 continues by repeating the steps of randomly selecting (block 550), training (block 570), and evaluating (block 590) until at least one of criterion for ending the search is satisfied. Particularly, the processor 14 is configured to iteratively a select a random set of operations to be used in place of the undefined operations of the building block 100, train the deep CNN 400 using the randomly selected operations, and evaluate the at least one performance metric as discussed above. In some embodiments, the processor 14 is configured to end the search process after a predetermined number of trials. In other embodiments, the processor 14 is configured to end the search process after the evaluated at least one performance metric reaches a predetermined threshold performance. In at least on embodiment, the processor is configured to compared the stored values of the performance metrics to determine which selected set of operations provided the highest performance of all of the trials. In at least on embodiment, the processor 14 is configured to output the selected set of operations corresponding to the trial having a highest performance according to the stored values of the performance metrics. Due to the limited search space, as little as 50 iterations are often sufficient to explore the search space and find a high performing model.

In at least one embodiment, a non-transitory copy of the programming instructions for individual ones of the aforementioned methods and processes (e.g., the method 500, the deep CNN building block design program 28, the building block 100, the exemplary possible operations used the building block 100, or the deep CNN 400) may be placed into non-transitory storage devices (such as e.g., memory 16) during manufacture thereof, or in the field, through e.g., a distribution medium (not shown), such as a compact disc (CD), or through the network communications module 22 (from an remote server). That is, one or more distribution media having an implementation of the program may be employed to distribute the program to various computing devices.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for determining a structure of a deep convolutional neural network for performing a particular task, the method comprising:
    storing, in a memory, a training dataset and a validation dataset related to the particular task, the training dataset and the validation dataset each including a plurality of labeled input and output data pairs;
    storing, in the memory, program instructions implementing a first convolutional neural network having an input and an output, the first convolutional neural having a residual branch and feedforward branch connected in parallel between an input of the first convolutional neural network and a summation element, the summation element being configured to provide the output of the first convolutional neural network as a summation of an output of the residual branch and the input of the first convolutional neural network, the residual branch including at least one layer configured to perform at least one undefined operation to provide the output of the residual branch;
    selecting, with a processor, at least one operation from a defined set of operations;
    training, with the processor, a second convolutional neural network using the training data, the second convolutional neural network being formed, at least in part, by the first convolutional neural network, the selected at least one operation being used in place of the at least one undefined operation of the first convolutional neural network during the training; and
    evaluating, with the processor, at least one performance metric of the trained second convolutional neural network using the validation dataset.

2. The method according to claim 1 further comprising: repeating the selecting, the training, and the evaluating until at least one criterion is satisfied.

3. The method according to claim 2 further comprising, storing, in the memory, a value of the at least one performance metric after each repetition of the selecting, the training, and the evaluating; and
    after the at least one criterion is satisfied, comparing, with the processor, the values of the at least one performance metric corresponding to each repetition of the selecting, the training, and the evaluating.

4. The method according to claim 3 further comprising: outputting, with the processor, the selected at least one operation corresponding to the repetition of the selecting, the training, and the evaluating having a highest value of the at least one performance metric.

5. The method according to claim 1, the selecting further comprising:
    randomly selecting, with the processor, the at least one operation from the defined set of possible operations.

6. The method according to claim 1, wherein the second convolutional neural network is formed, at least in part, by a plurality of repetitions of the first convolutional neural network arranged in series, in each case the selected at least one operation being used in place of the at least one undefined operation of the first convolutional neural network during the training.

7. The method according to claim 6, wherein the second convolutional neural network is formed, at least in part, by a plurality of convolutional layers arranged in series followed by the plurality of repetitions of the first convolutional neural network, each convolutional layer in the plurality of convolutional layers configured to filter its input with a convolutional filter.

8. The method according to claim 1, wherein the residual branch of the first convolutional neural network comprises:
    a first convolutional layer configured to perform a convolution operation on the input of the first convolutional neural network;
    a plurality of second convolutional layers arranged in parallel and configured to perform an undefined convolution operation on an output of the first convolutional layer, each convolutional layer in the plurality of second convolutional layers having an filter dimension; and
    an combination layer configured to perform an undefined combination operation to combine outputs of the plurality of second convolutional layers.

9. The method according to claim 8, wherein the residual branch of the first convolutional neural network further comprise:
    a third convolutional layer configured to perform a convolution operation on the output of the combination layer.

10. The method according to claim 9, wherein:
    the first convolutional layer of the residual branch is configured to reduce a feature depth of the input of the first convolutional neural network; and
    the third convolutional layer of the residual is configured to increase a feature depth of the output of the combination layer.

11. The method according claim 8, the selecting further comprising:

selecting, with the processor, for each second convolutional layer in the plurality of second convolutional layers, a convolution operation from a defined set of convolution operations;
selecting, with the processor, a value of the filter dimension of each second convolutional layer in the plurality of second convolutional layers from a predetermine set of values; and
selecting, with the processor, a combination operation from a defined set of combination operations.

12. The method according the claim 11, the selecting of the value of the filter dimension of each convolutional layer in the plurality of parallel convolutional layers further comprising:
selecting, with the processor, a same value for the filter dimension of each second convolutional layer in the plurality of second convolutional layers.

13. The method according claim 11, wherein the defined set of convolution operations includes a first convolution operation comprising:
filtering, with the processor, an input of the first convolution operation with a k×k convolutional filter, where k is the filter dimension of the first convolution operation.

14. The method according claim 11, wherein the defined set of convolution operations includes a second convolution operation comprising:
filtering, with the processor, an input of the second convolution operation with a k×1 convolutional filter followed by a 1×k convolutional filter, where k is the filter dimension of the second convolution operation.

15. The method according claim 11, wherein the defined set of convolution operations includes a third convolution operation comprising:
filtering, with the processor, an input of the third convolution operation with a depthwise convolutional filter followed by a pointwise convolutional filter.

16. The method according claim 11, wherein the defined set of combination operations includes a first combination operation comprising:
concatenating, with the processor, the outputs of the plurality of parallel convolutional layers.

17. The method according claim 11, wherein the defined set of combination operations includes a second combination operation comprising:
adding, with the processor, the outputs of the plurality of parallel convolutional layers.

18. The method according claim 11, wherein the defined set of combination operations includes a third combination operation comprising:
adding, with the processor, the outputs of the plurality of parallel convolutional layers, weighted by random constants.

19. A system for determining a structure of a deep convolutional neural network for performing a particular task, the system comprising:
a data storage device configured to store (i) a training dataset and a validation dataset related to the particular task, the training dataset and the validation dataset each including a plurality of labeled input and output data pairs, and (ii) a plurality of program instructions, the plurality of program instructions including program instructions implementing a first convolutional neural network having an input and an output, the first convolutional neural having a residual branch and feedforward branch connected in parallel between an input of the first convolutional neural network and a summation element, the summation element being configured to provide the output of the first convolutional neural network as a summation of an output of the residual branch and the input of the first convolutional neural network, the residual branch including at least one layer configured to perform at least one undefined operation to provide the output of the residual branch; and
at least one processor operably connected to the data storage device, the at least one processor being configured to execute the plurality of program instructions on the data storage device to:
randomly select at least one operation from a defined set of operations;
train a second convolutional neural network using the training data, the second convolutional neural network being formed, at least in part, by the first convolutional neural network, the selected at least one operation being used in place of the at least one undefined operation of the first convolutional neural network during the training; and
evaluate at least one performance metric of the trained second convolutional neural network using the validation dataset.

* * * * *